US009791255B1

(12) United States Patent
Mills

(10) Patent No.: US 9,791,255 B1

(45) Date of Patent: Oct. 17, 2017

(54) GUTTER MARKING TEMPLATE SET

(71) Applicant: Danny J. Mills, Shreveport, LA (US)

(72) Inventor: Danny J. Mills, Shreveport, LA (US)

( * ) Notice: Subject to any disclaimer, the term of this patent is extended or adjusted under 35 U.S.C. 154(b) by 0 days.

(21) Appl. No.: 15/425,244

(22) Filed: Feb. 6, 2017

(51) Int. Cl.
*G01B 3/14* (2006.01)
*E04D 13/064* (2006.01)

(52) U.S. Cl.
CPC ........... *G01B 3/14* (2013.01); *E04D 13/0643* (2013.01)

(58) Field of Classification Search
CPC .............................. G01B 3/14; E04D 13/0643
USPC ............................................................ 33/562
See application file for complete search history.

(56) References Cited

U.S. PATENT DOCUMENTS

| | | | | | |
|---|---|---|---|---|---|
| 1,125,010 | A * | 1/1915 | Doner | B25H 7/00 33/481 |
| 2,777,487 | A * | 1/1957 | Potts | B27G 5/02 269/40 |
| 2,965,969 | A * | 12/1960 | Haley | E04G 21/1891 33/481 |
| 3,222,792 | A * | 12/1965 | Eshom | E04F 21/04 33/526 |
| 4,930,225 | A * | 6/1990 | Phillips | B25H 7/00 33/526 |
| 5,203,090 | A * | 4/1993 | Bouska | E04F 21/1855 33/33 |
| 5,450,677 | A * | 9/1995 | Casey | B25H 7/005 33/373 |
| 6,305,091 | B1 * | 10/2001 | Tegels | E04F 21/003 269/43 |
| 7,086,171 | B2 * | 8/2006 | Lawson | G01B 3/14 33/562 |
| 8,887,407 | B2 * | 11/2014 | Silva | F01D 11/001 33/562 |
| 2006/0230626 | A1 * | 10/2006 | Mansfield | B25H 7/00 33/562 |
| 2009/0205216 | A1 * | 8/2009 | Ai | E04D 15/02 33/563 |

(Continued)

*Primary Examiner* — Christopher Fulton

(74) *Attorney, Agent, or Firm* — R. Keith Harrison

(57) ABSTRACT

A gutter marking template set includes a right-handed gutter marking template and a left-handed gutter marking template, each including a template frame having a first template frame surface and a second template frame surface. The template frame may include a main frame member having a first main frame member end and a second main frame member end. A first frame member may be carried by the main frame member and may have a first frame member surface extending between and at a cut angle with respect to the first template frame surface and the second template frame surface. A second frame member may be carried by the main frame member in spaced-apart relationship to the first frame member. The second frame member may have a second frame member surface extending between and at the cut angle with respect to the first template frame surface and the second template frame surface and parallel to the first frame member surface. A first frame notch may be provided at the first main frame member end of the main frame member. A second frame notch may be provided at the second main frame member end of the main frame member. A spanning frame member may extend between the first frame member and the second frame member and in spaced-apart relationship to the main frame member.

20 Claims, 10 Drawing Sheets

(56) References Cited

U.S. PATENT DOCUMENTS

2010/0095543 A1 * 4/2010 Inthavong ................ H02G 1/00
33/528

* cited by examiner

GUTTER MARKING TEMPLATE SET

FIELD

Illustrative embodiments of the disclosure generally relate to gutters for buildings. More particularly, illustrative embodiments of the disclosure relate to a gutter marking template set which facilitates marking and cutting of a straight gutter segment into a pair of angle-ended gutter segments for placement at a corner of the gutter.

SUMMARY

Illustrative embodiments of the disclosure are generally directed to a gutter marking template set which facilitates marking and cutting of a straight gutter segment into a pair of angle-ended gutter segments for placement at a corner of the gutter. An illustrative embodiment of the gutter marking template set includes a right-handed gutter marking template and a left-handed gutter marking template, each including a template frame having a first template frame surface and a second template frame surface. The template frame may include a main frame member having a first main frame member end and a second main frame member end. A first frame member may be carried by the main frame member and may have a first frame member surface extending between and at a cut angle with respect to the first template frame surface and the second template frame surface. A second frame member may be carried by the main frame member in spaced-apart relationship to the first frame member. The second frame member may have a second frame member surface extending between and at the cut angle with respect to the first template frame surface and the second template frame surface and parallel to the first frame member surface. A first frame notch may be provided at the first main frame member end of the main frame member. A second frame notch may be provided at the second main frame member end of the main frame member. A spanning frame member may extend between the first frame member and the second frame member and in spaced-apart relationship to the main frame member.

BRIEF DESCRIPTION OF THE DRAWINGS

Illustrative embodiments of the disclosure will now be described, by way of example, with reference to the accompanying drawings, in which.

DETAILED DESCRIPTION

The following detailed description is merely exemplary in nature and is not intended to limit the described embodiments or the application and uses of the described embodiments. As used herein, the word “exemplary” or “illustrative” means “serving as an example, instance, or illustration.” Any implementation described herein as “exemplary” or “illustrative” is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms “upper”, “lower”, “left”, “rear”, “right”, “front”, “vertical”, “horizontal”, and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
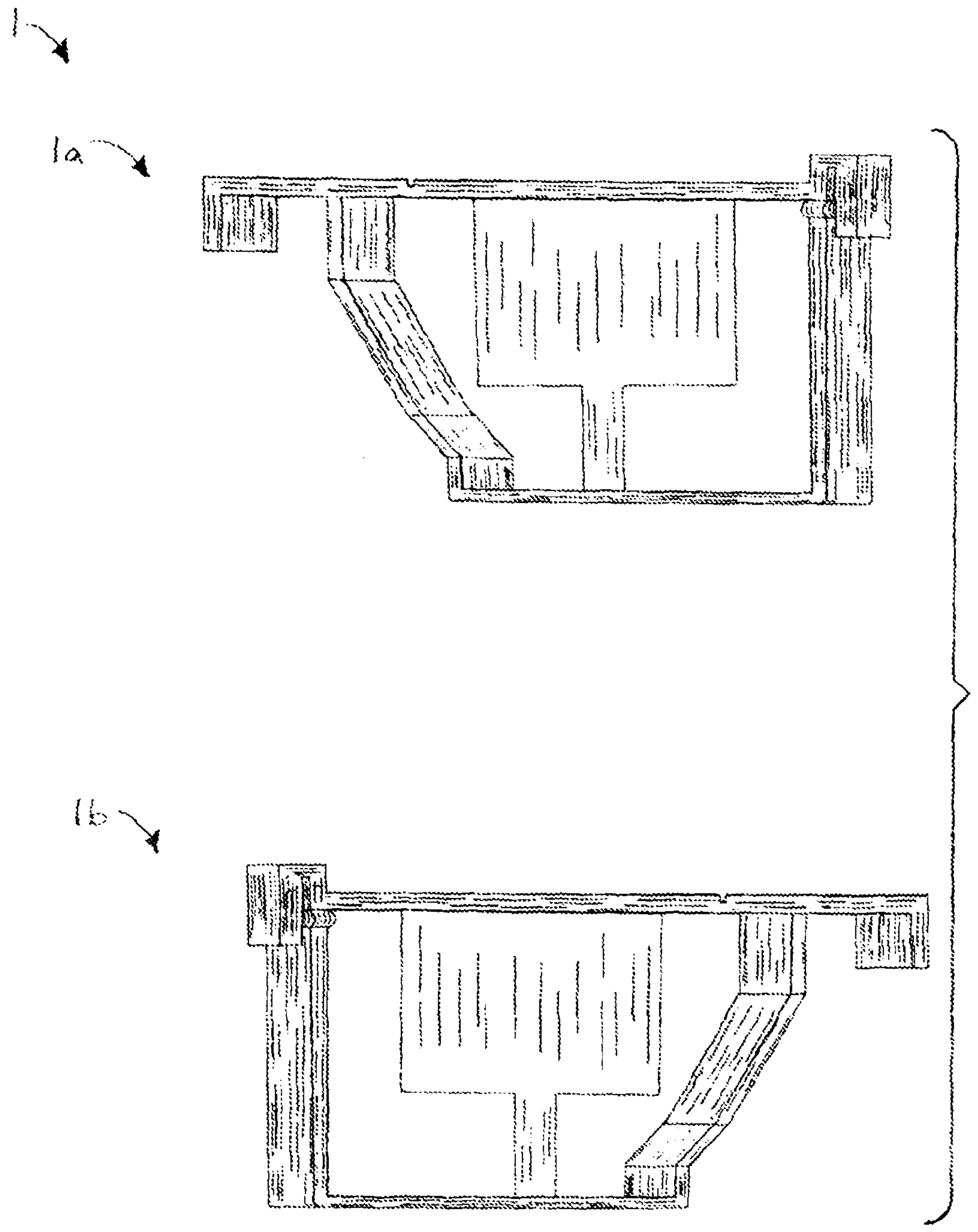
FIG. 1 are front views of illustrative right-handed gutter marking template and a typical left-handed gutter marking template according to an illustrative embodiment of the gutter marking template set.
Figure 2:
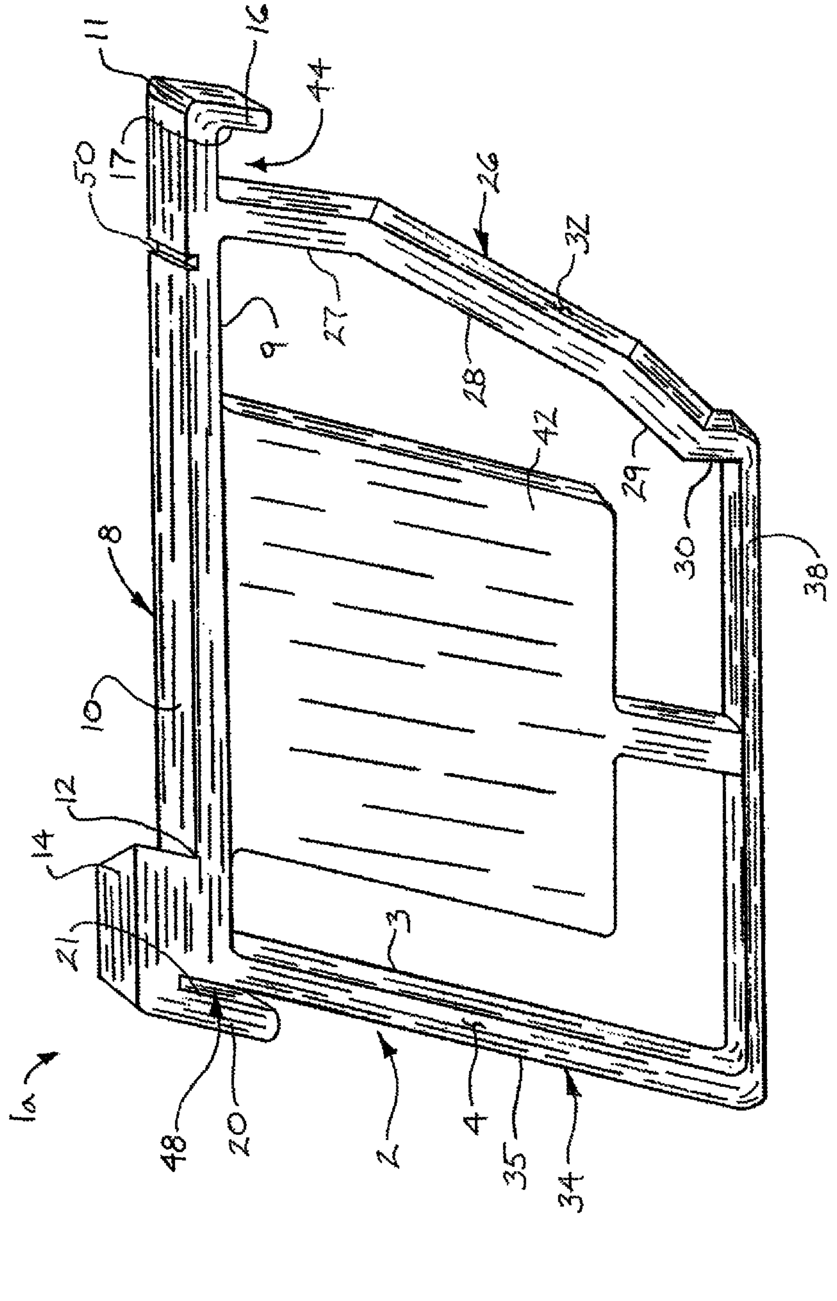
FIG. 2 is a rear perspective view of the illustrative right-handed gutter marking template of the gutter marking template set.
Figure 3:
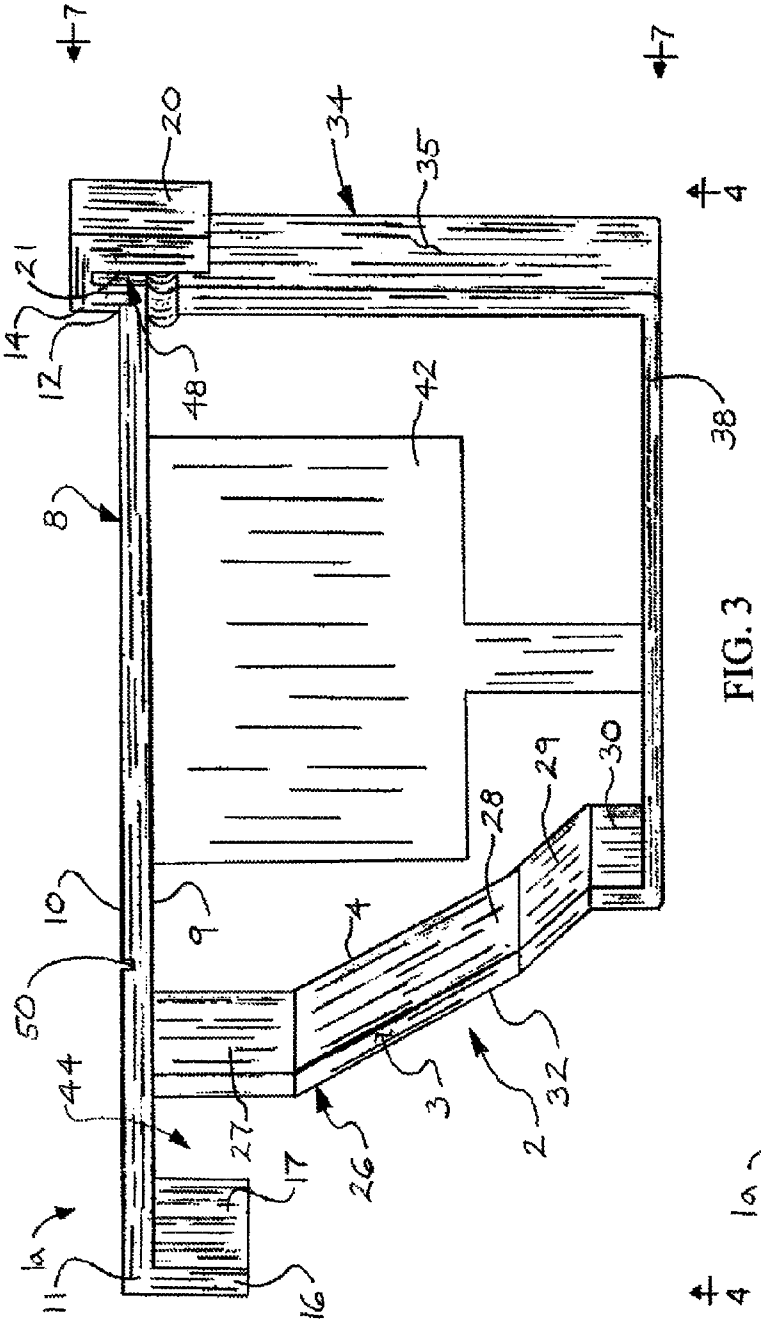
FIG. 3 is a front view of the illustrative right-handed gutter marking template.
Figure 9:
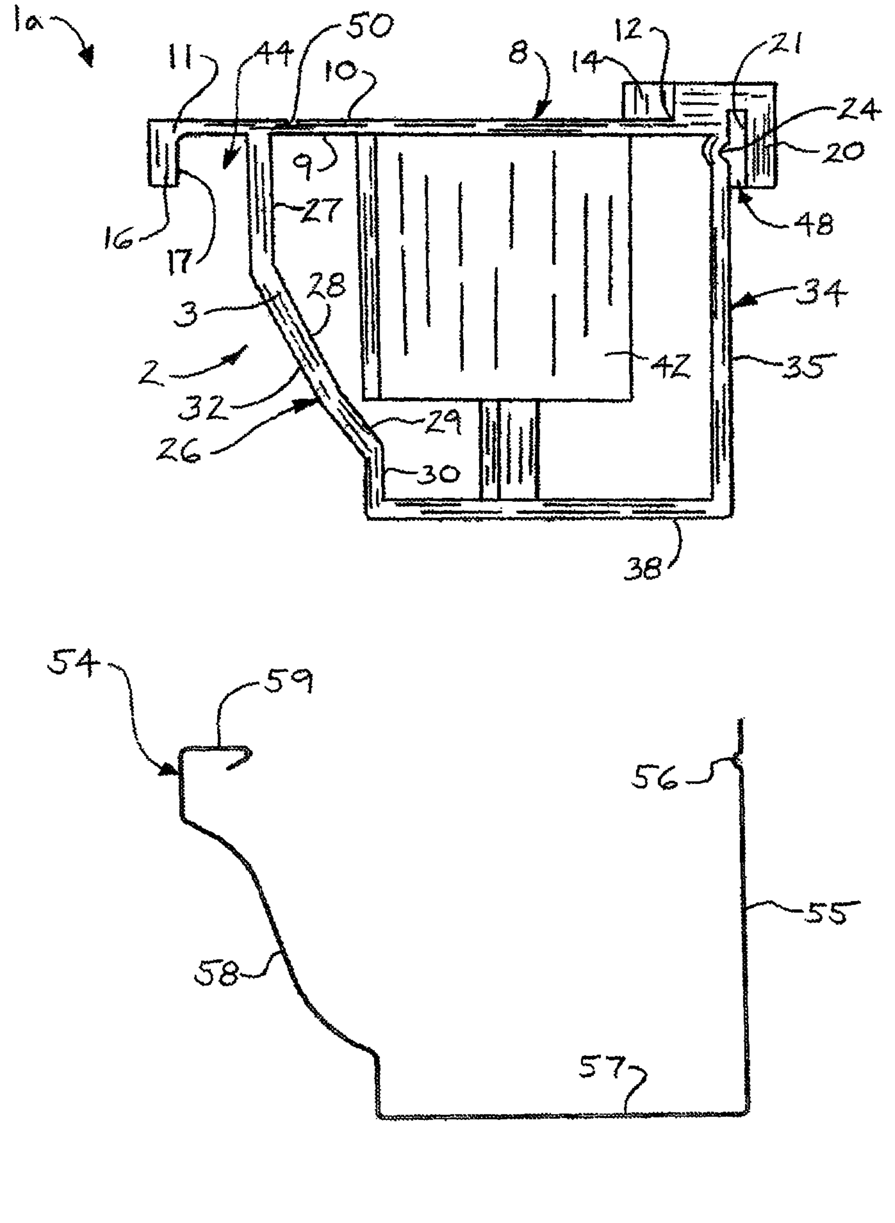
FIG. 9 is an exploded front perspective view of the illustrative right-handed gutter marking template and an end view of a straight gutter segment, more particularly illustrating typical placement of the gutter marking template in the straight gutter segment preparatory to marking and cutting of the straight gutter segment into a pair of angle-ended gutter segments.
Figure 10:
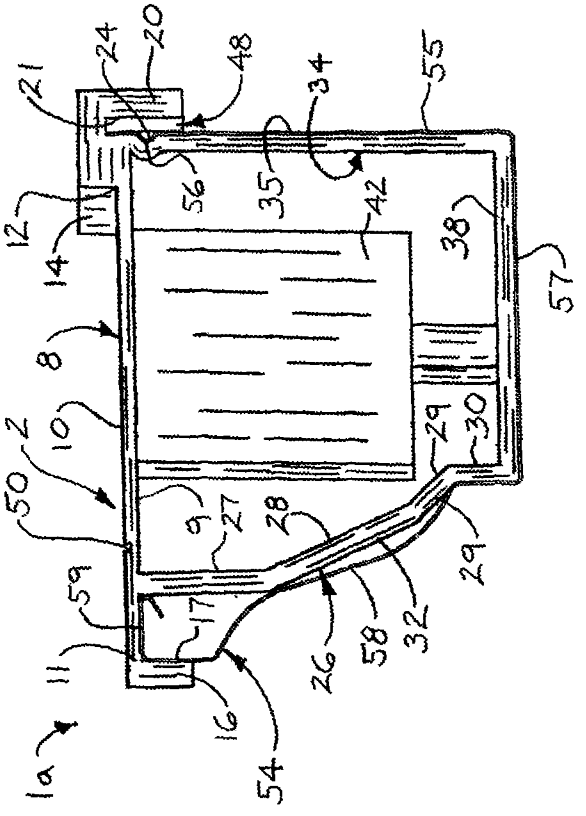
FIG. 10 is a front perspective view of the illustrative right-handed gutter marking template and end view of the straight gutter segment illustrated in FIG. 9, with the gutter marking template placed in the straight gutter segment preparatory to marking and cutting the straight gutter segment into the pair of angle-ended gutter segments.
Figure 12A:
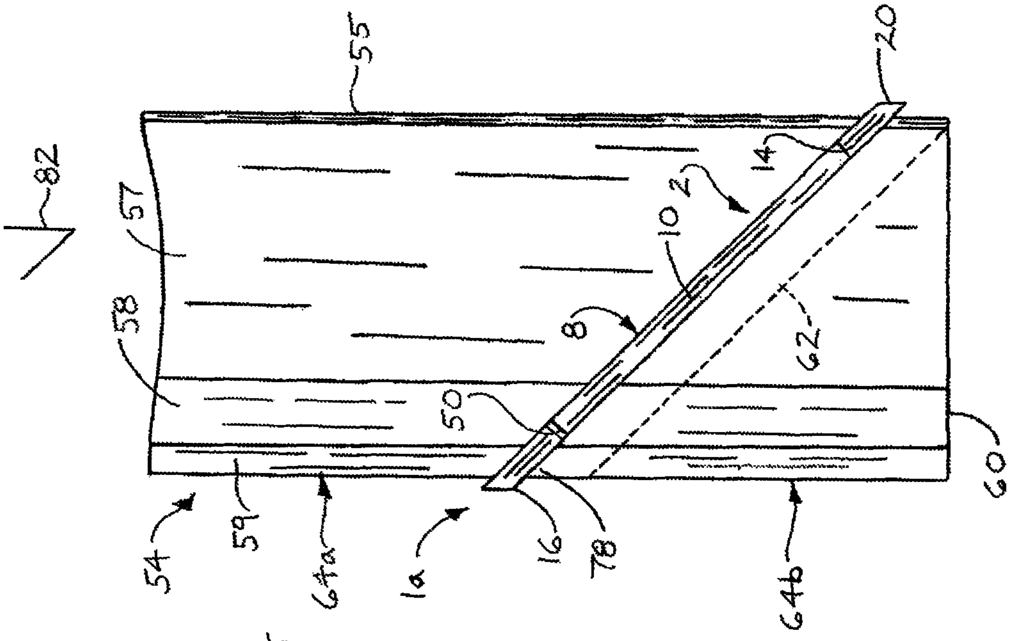
FIG. 12A is a top view of the first straight gutter segment with the illustrative right-handed gutter marking template placed in the first straight gutter segment as illustrated in FIG. 11 and the cut line illustrated in phantom.
Figure 11:
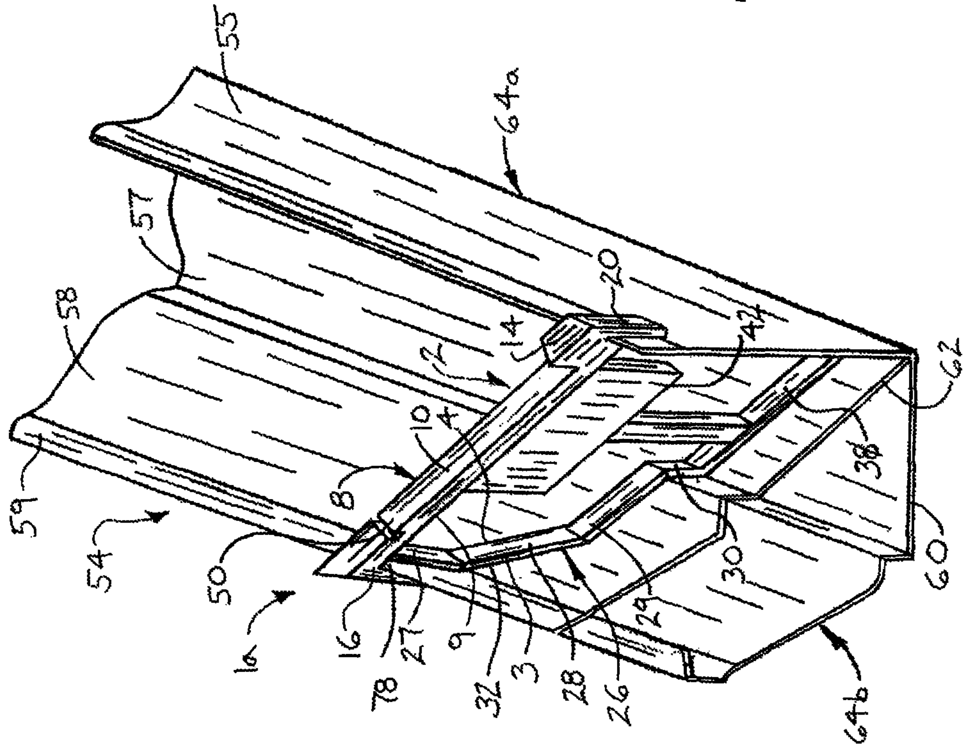
FIG. 11 is a perspective view of a first straight gutter segment (partially in section), with the illustrative right-handed gutter marking template placed in the first straight gutter segment at a cut angle with respect to the longitudinal axis of the first straight gutter segment, further illustrating a cut line marked on the first straight gutter segment parallel to the gutter marking template for subsequent cutting of the first straight gutter segment into a pair of angle-ended gutter segments.
Figure 12B:
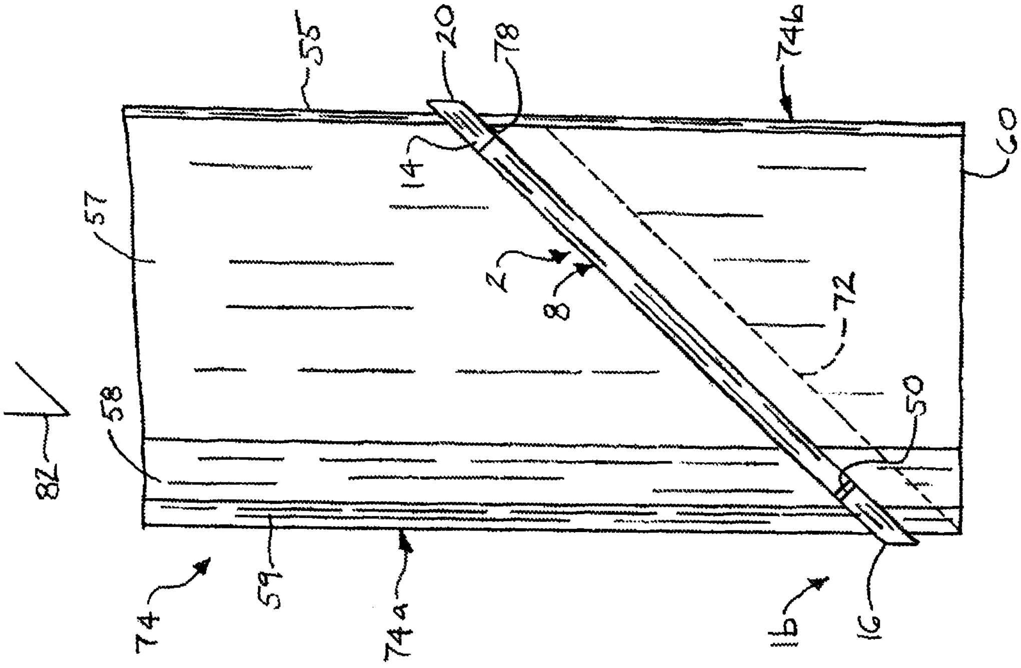
FIG. 12B is a top view of a second straight gutter segment with the illustrative left-handed gutter marking template placed in the second straight gutter segment the cut line illustrated in phantom.
Figure 14:
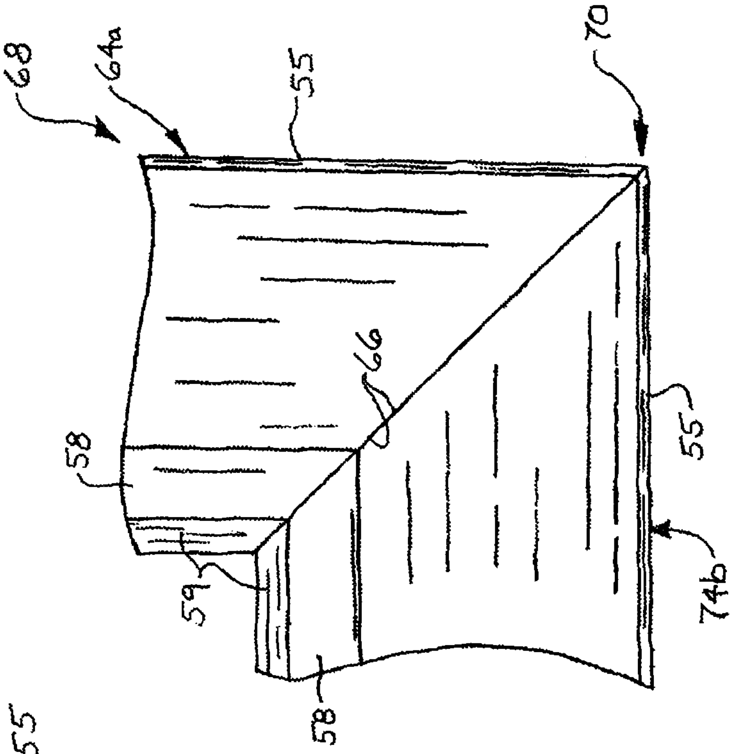
FIG. 14 is a top view of the pair of angle-ended gutter segments placed in contiguous, end-to-end relationship to each other to form the corner of the gutter.
Figure 13:
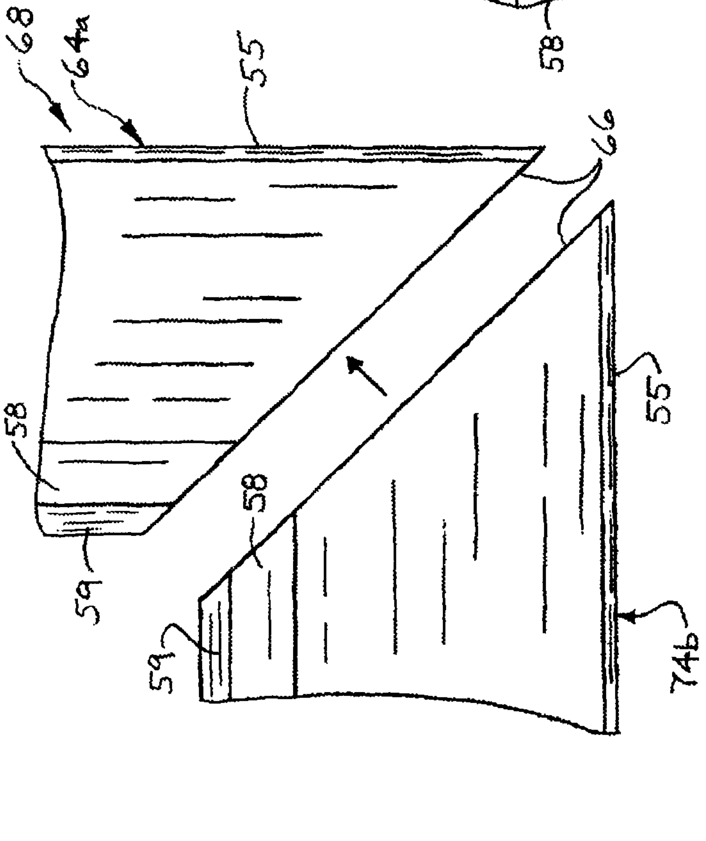
FIG. 13 is a top view of a pair of angle-ended gutter segments (partially in section) cut from the first straight gutter segment and the second straight gutter segment, being placed in contiguous, end-to-end relationship to each other to form a corner of a gutter after marking of the straight gutter segments using the gutter marking templates and cutting of the straight gutter segments along the respective cut lines to form the angle-ended gutter segments.

Referring initially to FIGS. 1 and 9-14 of the drawings, an illustrative embodiment of the gutter cutting template set is generally indicated by reference numeral 1 in FIG. 1. The gutter cutting template set 1 may include a right-handed gutter marking template 1*a* and a left-handed gutter marking template 1*b* which may be a mirror-image of the right-handed gutter marking template 1*a*. In typical application, which will be hereinafter described, the right-handed gutter cutting template 1*a* can be used as a guide to mark a first cut line 62 on a first straight gutter segment 54 at a cut angle 82 (FIGS. 12A and 12B) with respect to a longitudinal axis of the first straight gutter segment 54, as illustrated in FIGS. 11 and 12A. In like manner, the left-handed gutter template 1*b* can be used as a guide to mark a second cut line 72 on a second straight gutter segment 74 at the cut angle 82 with respect to a longitudinal axis of the second straight gutter segment 74, as illustrated in FIG. 12B. The first straight gutter segment 54 can be cut along the cut line 62 to form a first angle-ended gutter segment 64*a* and a second angle-ended gutter segment 64*b*, each having an angled end 66 which corresponds to the cut angle 82. The second straight gutter segment 74 can likewise be cut along the cut line 72 to form a first angle-ended gutter segment 74*a* and a second angle-ended gutter segment 74*b*, each also having an angled end 66 which corresponds to the cut angle 82. As illustrated in FIG. 13, the first angle-ended gutter segment 64*a* from the first straight gutter segment 54 and the second angle-ended gutter segment 74*b* from the second straight gutter segment 74 can be joined along their cut angled ends 66 to form a gutter 68 having a gutter corner 70 (FIG. 14) at the corner of a building on which the gutter 68 is installed. In like manner, the second angle-ended gutter segment 64*b* from the first straight gutter segment 54 and the first angle-ended gutter segment 74*a* from the second straight gutter segment 74 can be joined to form a gutter 68 having a gutter corner 70.

Referring next to FIGS. 2-10 of the drawings, the right-handed gutter cutting template 1*a* will be hereinafter described in detail. The left-handed gutter marking template 1*b* may have a design which is the same as or similar to that of the right-handed gutter cutting template 1*a*, except that the left-handed gutter marking template 1*b* may be a mirror-image of the right-handed gutter marking template 1*a*. The right-handed gutter marking template 1*a* may include a template frame 2 which may be generally elongated and rectangular in shape. The template frame 2 may be fabricated of plastic, composite material, metal and/or any other material which is suitable for the purpose using molding, casting, machining and/or other fabrication techniques known by those skilled in the art. The template frame 2 may have a first template frame surface 3 and a second template frame surface 4. In some embodiments, the first template frame surface 3 and the second template frame surface 4 may be generally planar.

The template frame 2 may include a main frame member 8. A first frame member 26 and a second frame member 34 may extend from the main frame member 8 in spaced-apart relationship to each other. A spanning frame member 38 may extend between the first frame member 26 and the second frame member 34 in generally parallel, spaced-apart relationship to the main frame member 8. In some embodiments, at least one frame brace 42 may extend between the main frame member 8 and the spanning frame member 38 and/or between the first frame member 26 and the second frame member 34 of the template frame 2 for reinforcement purposes.

Figure 4:
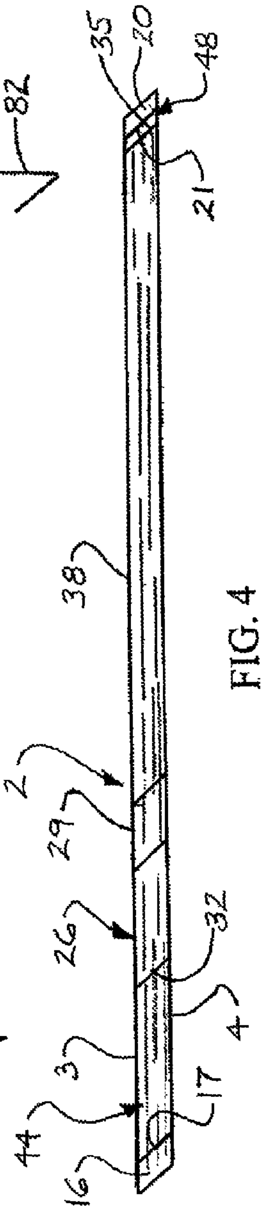
FIG. 4 is a bottom view of the illustrative right-handed gutter marking template, taken along viewing lines 4-4 in FIG. 3.
Figure 5:
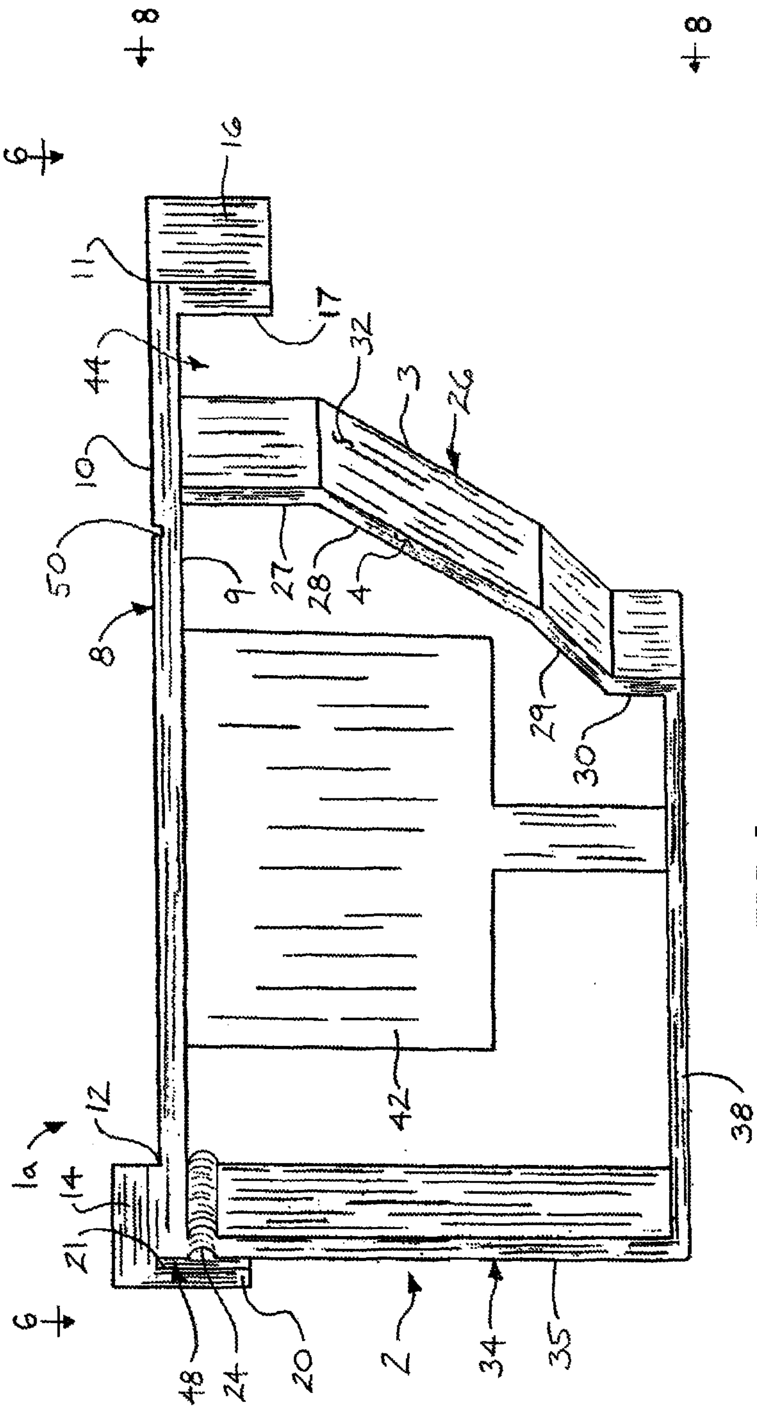
FIG. 5 is a rear view of the illustrative right-handed gutter marking template.
Figure 6:
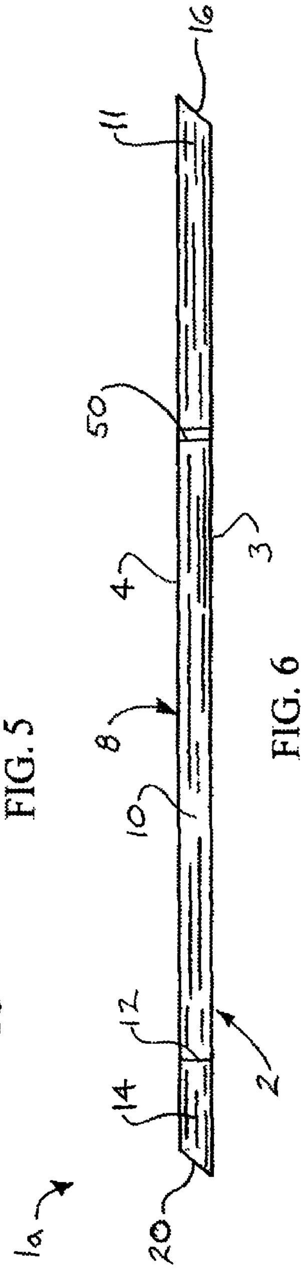
FIG. 6 is a top view of the illustrative right-handed gutter marking template, taken along viewing lines 6-6 in FIG. 5.
Figure 8:
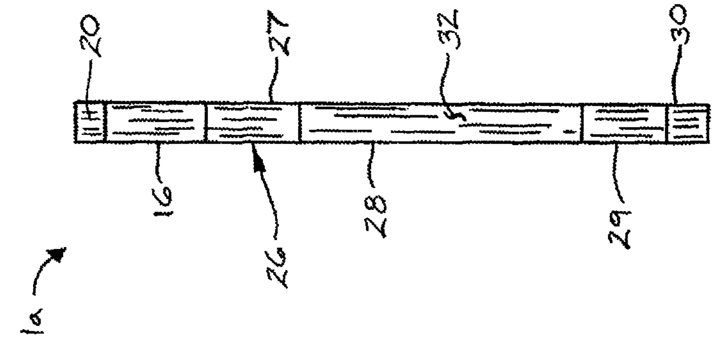
FIG. 8 is a right side view of the illustrative right-handed gutter marking template, taken along viewing lines 8-8 in FIG. 5.
Figure 7:
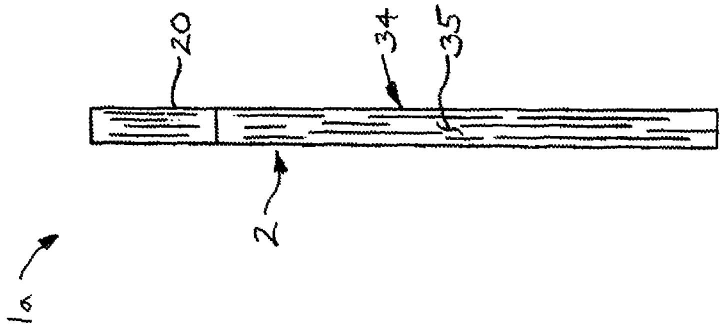
FIG. 7 is a left side view of the illustrative right-handed gutter marking template, taken along viewing lines 7-7 in FIG. 3.

The main frame member 8 of the template frame 2 may be generally elongated with a lower main frame member surface 9, an upper main frame member surface 10, a first main frame member end 11 and a second main frame member end 12. A first frame flange 16 may terminate the first main frame member end 11 of the main frame member 8. The first frame flange 16 may be generally perpendicular to a longitudinal axis of the main frame member 8. The first frame flange 16 may have a first flange inner surface 17 which extends from the first template frame surface 3 to the second template frame surface 4 of the template frame 2, as illustrated in FIG. 4. The first frame flange 16 is disposed at the cut angle 82 (FIG. 4) with respect to each of the first template frame surface 3 and the second template frame surface 4. In some embodiments, the first flange inner surface 17 may be disposed at a cut angle 82 of about 45 degrees with respect to each of the first template frame surface 3 and the second template frame surface 4. In other embodiments, the first flange inner surface 17 may be disposed at a cut angle 82 of less than or greater than 45 degrees depending on the desired angle of the gutter corner 70 (FIG. 14) of the gutter 68 which is to be fabricated.

A frame protrusion 14 may extend upwardly from the upper main frame member surface 10 at the second main frame member end 12 of the main frame member 8. A second frame flange 20 may extend downwardly from the frame protrusion 14. The second frame flange 20 may be generally perpendicular to a longitudinal axis of the main frame member 8. The second frame flange 20 may have a second flange inner surface 21 which extends at the cut angle 82 from the first template frame surface 3 to the second template frame surface 4 of the template frame 2, as further illustrated in FIG. 4. The second flange inner surface 21 on the second frame flange 20 may be generally parallel to the first flange inner surface 17 of the first frame flange 16 and disposed at the same cut angle 82 with respect to each of the first template frame surface 3 and the second template frame surface 4 as the first flange inner surface 17.

A measuring notch 50 may be provided in the upper main frame member surface 10 of the main frame member 8 at a selected spacing from the frame protrusion 14. In some embodiments, the spacing between the measuring notch 50 and the frame protrusion 14 may be about 6 inches. The purpose of the measuring notch 50 will be hereinafter described.

The first frame member 26 of the template frame 2 may be generally elongated and may extend from the lower main frame member surface 9 of the main frame member 8. The first frame member 26 may be curved, or alternatively, may be multi-segmented, as illustrated, for purposes which will be hereinafter described. Accordingly, in some embodiments, the first frame member 26 may include a proximal segment 27 which extends from the main frame member 8 in generally perpendicular relationship thereto. A middle segment 28 may extend from the proximal segment 27. A distal segment 29 may extend from the middle segment 28. A terminal segment 30 may extend from the distal segment 29. The middle segment 28, the distal segment 29 and the terminal segment 30 may be disposed at an obtuse angle with respect to the proximal segment 27 and each other.

The first frame member 26 may have a first frame member surface 32. As illustrated in FIG. 4, the first frame member surface 32 on the first frame member 26 may be generally parallel to the first flange inner surface 17 of the first frame flange 16 and the second flange inner surface 21 on the second frame flange 20 and disposed at the same cut angle 82 with respect to each of the first template frame surface 3 and the second template frame surface 4. A first frame notch 44, the purpose of which will be hereinafter described, may be formed by and between the first flange inner surface 17 on the first frame flange 16 and the first frame member surface 32 on the first frame member 26. The first frame notch 44 may be sized and configured to accommodate a front gutter flange 59 (FIGS. 9 and 10) on a front gutter panel 58 of the corresponding first straight gutter segment 54 or second straight gutter segment 74, in typical application of the gutter cutting template set 1, which will be hereinafter described.

The second frame member 34 of the template frame 2 may be generally elongated and may extend from the lower template surface member 9 of the main frame member 8 in spaced-apart relationship to the first frame member 26. The second frame member 34 may be disposed generally at or adjacent to the second main frame member end 12 of the main frame member 8.

The second frame member 34 may have a second frame member surface 35. As illustrated in FIG. 4, the second frame member surface 35 on the second frame member 34 may be generally parallel to the first flange inner surface 17 of the first frame flange 16 and the second flange inner surface 21 on the second frame flange 20 and disposed at the same cut angle 82 with respect to each of the first template frame surface 3 and the second template frame surface 4. A second frame notch 48, the purpose of which will be hereinafter described, may be formed by and between the second flange inner surface 21 on the second frame flange 20 and the second frame member surface 35 on the second frame member 34. As illustrated in FIGS. 9 and 10, in some embodiments, a panel ridge notch 24 may be provided in the second frame member surface 35 in facing relationship to the second frame notch 48 for purposes which will be hereinafter described. The second frame notch 48 may be sized and configured to accommodate the upper edge of a rear gutter panel 55 (FIGS. 9 and 10) of the corresponding first straight gutter segment 54 or second straight gutter segment 74, in typical application of the gutter cutting template set 1, which will be hereinafter described.

Referring again to FIGS. 9-14 of the drawings, in typical application, the gutter cutting template set 1 may be used to mark a first straight gutter segment 54 and a second straight gutter segment 74 to facilitate angled cutting of each in fabrication of a gutter 68 having a gutter corner 70 (FIG. 14) at a corresponding corner of a building on which the gutter 68 is installed. Each of the first straight gutter segment 54 and the second straight gutter segment 74 may have a conventional gutter design with a rear gutter panel 55, a bottom gutter panel 57 and a front gutter panel 58. As illustrated in FIG. 9, in some applications, a shaped panel ridge 56 may extend along the length of the rear gutter panel 55 adjacent to the upper edge thereof. A front gutter flange 59 may be folded or shaped in the upper edge of the front gutter panel 58.

As illustrated in FIGS. 11 and 12A, the right-handed gutter cutting template 1*a* may initially be used as a guide to mark a first cut line 62 on a first straight gutter segment 54 at a typically 45-degree cut angle 82 with respect to a longitudinal axis of the first straight gutter segment 54. Accordingly, as illustrated in FIG. 9, the right-handed gutter cutting template 1*a* may initially be positioned above the first straight gutter segment 54, with the longitudinal axis of the template frame 2 oriented at the typically 45-degree cut angle 82 with respect to the longitudinal axis of the first straight gutter segment 54. Thus, the first flange inner surface 17, the second flange inner surface 21, the first frame member surface 32 and the second frame member surface 35 are oriented parallel to the longitudinal axis of the first straight gutter segment 54. Therefore, the first frame notch 44 aligns or registers with the front gutter flange 59, and the second frame notch 48 aligns or registers with the upper edge of the rear gutter panel 55. The template frame 2 of the right-handed gutter cutting template 1*a* may then be lowered in place to rest inside the first straight gutter segment 54 as the first frame notch 44 receives the front gutter flange 59 and the second frame notch 48 receives the rear gutter panel 55, as illustrated in FIG. 10. Thus, the first flange inner surface 17 on the first frame flange 16 engages the exterior surface of the front gutter panel 58, whereas the second flange inner surface 21 on the second frame flange 20 engages the exterior surface of the rear gutter panel 55. As illustrated in FIGS. 10 and 11, the typically curved or multi-segmented first frame member 26 may generally coincide with the congruent, typically curved or stepped cross-sectional shape of the front gutter panel 58, and may engage the interior surface of the front gutter panel 58. The second frame member 34 may generally coincide with the congruent, typically straight and vertical cross-sectional shape of the rear gutter panel 55, and may engage the interior surface of the rear gutter panel 55. As further illustrated in FIG. 10, the panel ridge 56 on the rear gutter panel 55 may insert into the companion panel ridge notch 24 in the second frame member 34.

In some applications, prior to deployment of the template frame 2 inside the first straight gutter segment 54, the measuring notch 50 may be used to measure and mark the distance from the gutter segment end 60 of the first straight gutter segment 54 to the desired position 78 of the first frame flange 16 in the deployed position of the right-handed gutter cutting template 1*a*. This may be accomplished by placing the frame protrusion 14 into engagement with the gutter segment end 60 of the front gutter panel 58 and marking the desired position 78 of the measuring notch 50 on the front gutter flange 59.

After the right-handed gutter cutting template 1*a* is deployed in place in the first straight gutter segment 54, as was heretofore described with respect to FIGS. 10-12A, the first frame member 26, the second frame member 34 and the spanning frame member 38 may serve as a guide, template or straight edge for a writing implement (not illustrated) which may be used to mark the first cut line 62 on the first straight gutter segment 54. Thus, the first cut line 62 may run adjacent and parallel to the first frame member 26, the second frame member 34 and the spanning frame member 38 of the template frame 2. The first straight gutter segment 54 may then be cut along the first cut line 62 to form a first angle-ended gutter segment 64*a* and a second angle-ended gutter segment 64*b*, each having an angled end 66 (FIG. 13) which corresponds to the cut angle 82 of the template frame 2, typically 45-degrees with respect to the longitudinal axis of the first straight gutter segment 54.

As illustrated in FIG. 12B, in like manner, the left-handed gutter template 1*b* can be used as a guide to mark a second cut line 72 on a second straight gutter segment 74 at the cut angle 82 with respect to a longitudinal axis of the second straight gutter segment 74. The second straight gutter segment 74 can then be cut along the second cut line 72 to form a first angle-ended gutter segment 74_a_ and a second angle-ended gutter segment 74_b_ each having an angled end 66 which corresponds to the cut angle 82 of the template frame 2.

As illustrated in FIG. 13, the first angle-ended gutter segment 64_a_ from the first straight gutter segment 54 and the second angle-ended gutter segment 74_b_ from the second straight gutter segment 74 can be joined along their angled ends 66 to form a gutter 68 having a gutter corner 70 with an angle of typically 90 degrees at the corner of a building on which the gutter 68 is installed. In like manner, the second angle-ended gutter segment 64_b_ from the first straight gutter segment 54 and the first angle-ended gutter segment 74_a_ from the second straight gutter segment 74 can be joined to form a gutter 68 having a gutter corner 70.

While certain illustrative embodiments of the disclosure have been described above, it will be recognized and understood that various modifications can be made to the embodiments and the appended claims are intended to cover all such modifications which may fall within the spirit and scope of the disclosure.

What is claimed is:

1. A gutter marking template set, comprising:

a right-handed gutter marking template and a left-handed gutter marking template, each including a template frame having a first template frame surface and a second template frame surface, the template frame including:

a main frame member having a first main frame member end and a second main frame member end;

a first frame member carried by the main frame member, the first frame member having a first frame member surface extending between and at a cut angle with respect to the first template frame surface and the second template frame surface;

a second frame member carried by the main frame member in spaced-apart relationship to the first frame member, the second frame member having a second frame member surface extending between and at the cut angle with respect to the first template frame surface and the second template frame surface and parallel to the first frame member surface;

a first frame notch at the first main frame member end of the main frame member;

a second frame notch at the second main frame member end of the main frame member; and a spanning frame member extending between the first frame member and the second frame member and in spaced-apart relationship to the main frame member.

2. The gutter marking template set of claim 1 further comprising at least one frame brace extending between the main frame member and the spanning frame member.

3. The gutter marking template set of claim 1 wherein the first frame member comprises a plurality of discrete segments.

4. The gutter marking template set of claim 3 wherein the plurality of discrete segments comprises a proximal segment extending from the main frame member, a middle segment extending from and at an obtuse angle with respect to the proximal segment, a distal segment extending from and at an obtuse angle with respect to the middle segment and a terminal segment extending from and at an obtuse angle with respect to the distal segment, the terminal segment terminating at the spanning frame member.

5. The gutter marking template set of claim 3 wherein the second frame member is generally straight.

6. The gutter marking template set of claim 1 further comprising a panel ridge notch in the second frame member, the panel ridge notch facing the second frame notch.

7. The gutter marking template set of claim 1 further comprising a measuring notch in the main frame member.

8. The gutter marking template set of claim 1 wherein the cut angle is about 45 degrees.

9. A gutter marking template set for facilitating marking of a cut line on a straight gutter segment at a cut angle with respect to a longitudinal axis of the straight gutter segment, the straight gutter segment having a first gutter panel and a second gutter panel, the gutter marking template comprising:

a right-handed gutter marking template and a left-handed gutter marking template each including a template frame having a generally planar first template frame surface and a generally planar second template frame surface generally parallel to the first template frame surface, the template frame including:

a main frame member having a first main frame member end and a second main frame member end;

a first frame member carried by the main frame member generally at or adjacent to the first main frame member end, the first frame member having a first frame member surface extending between and at the cut angle with respect to the first template frame surface and the second template frame surface;

a second frame member carried by the main frame member generally at or adjacent to the second main frame member end and in spaced-apart relationship to the first frame member, the second frame member having a second frame member surface extending between and at the cut angle with respect to the first template frame surface and the second template frame surface and parallel to the first frame member surface;

a first frame flange at the first main frame member end of the main frame member;

a first frame notch between the first frame flange and the first frame member, the first frame notch sized and configured to accommodate the first gutter panel of the straight gutter segment;

a second frame flange at the second main frame member end of the main frame member;

a second frame notch between the second frame flange and the second frame member, the second frame notch sized and configured to accommodate the second gutter panel of the straight gutter panel; and a spanning frame member extending between the first frame member and the second frame member and in generally spaced-apart and parallel relationship to the main frame member.

10. The gutter marking template set of claim 9 further comprising at least one frame brace extending between the main frame member and the spanning frame member.

11. The gutter marking template set of claim 9 wherein the first frame member comprises a plurality of discrete segments.

12. The gutter marking template set of claim 11 wherein the plurality of discrete segments comprises a proximal segment extending from the main frame member, a middle segment extending from and at an obtuse angle with respect to the proximal segment, a distal segment extending from and at an obtuse angle with respect to the middle segment and a terminal segment extending from and at an obtuse angle with respect to the distal segment, the terminal segment terminating at the spanning frame member.

13. The gutter marking template set of claim 11 wherein the second frame member is generally straight.

14. The gutter marking template set of claim 9 further comprising a panel ridge notch in the second frame member, the panel ridge notch facing the second frame notch.

15. The gutter marking template set of claim 9 further comprising a measuring notch in the main frame member.

16. The gutter marking template set of claim 9 wherein the cut angle is about 45 degrees.

17. A gutter marking template set for facilitating marking of a cut line on a straight gutter segment at a cut angle with respect to a longitudinal axis of the straight gutter segment, the straight gutter segment having a first gutter panel and a second gutter panel, the gutter marking template comprising:

a right-handed gutter marking template and a left-handed gutter marking template each including a template frame having a generally planar first template frame surface and a generally planar second template frame surface generally parallel to the first template frame surface, the template frame including:

a main frame member having a first main frame member end and a second main frame member end;

a measuring notch in the main frame member;

a first frame member carried by the main frame member generally at or adjacent to the first main frame member end, the first frame member having a first frame member surface extending between and at the cut angle of about 45 degrees with respect to the first template frame surface and the second template frame surface;

a second frame member carried by the main frame member generally at or adjacent to the second main frame member end and in spaced-apart relationship to the first frame member, the second frame member having a second frame member surface extending between and at the cut angle with respect to the first template frame surface and the second template frame surface and parallel to the first frame member surface;

a first frame flange at the first main frame member end of the main frame member;

a first frame notch between the first frame flange and the first frame member, the first frame notch sized and configured to accommodate the first gutter panel of the straight gutter segment;

a second frame flange at the second main frame member end of the main frame member;

a second frame notch between the second frame flange and the second frame member, the second frame notch sized and configured to accommodate the second gutter panel of the straight gutter segment;

a panel ridge notch in the second frame member, the panel ridge notch facing the second frame notch; and a spanning frame member extending between the first frame member and the second frame member and in generally spaced-apart and parallel relationship to the main frame member.

18. The gutter marking template set of claim 17 further comprising at least one frame brace extending between the main frame member and the spanning frame member.

19. The gutter marking template set of claim 17 wherein the first frame member comprises a plurality of discrete segments and the second frame member is generally straight.

20. The gutter marking template set of claim 19 wherein the plurality of discrete segments comprises a proximal segment extending from the main frame member, a middle segment extending from and at an obtuse angle with respect to the proximal segment, a distal segment extending from and at an obtuse angle with respect to the middle segment and a terminal segment extending from and at an obtuse angle with respect to the distal segment, the terminal segment terminating at the spanning frame member.

* * * * *